(12) United States Patent
Kido et al.

(10) Patent No.: US 9,166,685 B2
(45) Date of Patent: Oct. 20, 2015

(54) LIGHTING APPARATUS FOR VISIBLE LIGHT COMMUNICATION, AND VISIBLE LIGHT COMMUNICATION SYSTEM USING THE APPARATUS

(71) Applicant: Panasonic Corporation, Osaka (JP)

(72) Inventors: Shojirou Kido, Osaka (JP); Eiji Shiohama, Osaka (JP)

(73) Assignee: Panasonic Intellectual Property Management Co., Ltd., Osaka (JP)

( * ) Notice: Subject to any disclaimer, the term of this patent is extended or adjusted under 35 U.S.C. 154(b) by 44 days.

(21) Appl. No.: 14/356,426

(22) PCT Filed: Nov. 5, 2012

(86) PCT No.: PCT/JP2012/078574
§ 371 (c)(1),
(2) Date: May 6, 2014

(87) PCT Pub. No.: WO2013/077171
PCT Pub. Date: May 30, 2013

(65) Prior Publication Data
US 2014/0321860 A1    Oct. 30, 2014

(30) Foreign Application Priority Data

Nov. 21, 2011 (JP) .................................. 2011-254249

(51) Int. Cl.
*H04B 10/00* (2013.01)
*H04B 10/112* (2013.01)
(Continued)

(52) U.S. Cl.
CPC .............. *H04B 10/116* (2013.01); *H04B 10/54* (2013.01); *H05B 33/0845* (2013.01); *H05B 33/0815* (2013.01)

(58) Field of Classification Search
CPC .. H04B 10/54; H04B 10/112; H04B 10/1123; H04B 10/114; H04B 10/1143; H04B 10/116; H05B 33/0815; H05B 33/0845

USPC ........................... 398/127, 128, 175; 315/287
See application file for complete search history.

(56) References Cited

U.S. PATENT DOCUMENTS

2007/0092264 A1* 4/2007 Suzuki et al. ................. 398/189
2010/0123410 A1* 5/2010 Tsai .............................. 315/287
(Continued)

FOREIGN PATENT DOCUMENTS

JP    2004-120101 A    4/2004
JP    2005-176257 A    6/2005
(Continued)

OTHER PUBLICATIONS

International Search Report for corresponding International Application No. PCT/JP2012/078574 mailed Dec. 4, 2012.
(Continued)

*Primary Examiner* — Dalzid Singh
(74) *Attorney, Agent, or Firm* — Renner, Otto, Boisselle & Sklar, LLP (57) ABSTRACT

A lighting apparatus for visible light communication includes at least one luminaire body and a visible-light-communication-signal-outputting part. The luminaire body includes a light source that includes an LED. The visible-light-communication-signal-outputting part is configured to output a modulation signal to the luminaire body. The luminaire body further includes: a power supply circuit configured to dim the light source; a switch element for modulating an output current that is supplied from the power supply circuit to the light source; a resistor connected in parallel with the switch element; and a photo-coupler configured to receive the modulation signal output from the visible-light-communication-signal-outputting part. The visible-light-communication-signal-outputting part is provided outside the luminaire body, and is configured to transmit the modulation signal via the photo-coupler.

10 Claims, 4 Drawing Sheets

(51) Int. Cl.
*H04B 10/116* (2013.01)
*H05B 33/08* (2006.01)
*H04B 10/54* (2013.01)

(56) References Cited

U.S. PATENT DOCUMENTS

2010/0209118 A1* 8/2010 Takene et al. ............. 398/182
2012/0051757 A1 3/2012 Nishino et al.

FOREIGN PATENT DOCUMENTS

| JP | 2007-149344 A | 6/2007 |
|----|---------------|--------|
| JP | 2008-048205 A | 2/2008 |
| JP | 2008-066828 A | 3/2008 |
| JP | 2009-005192 A | 1/2009 |
| JP | 2009-005304 A | 1/2009 |
| JP | 2009-290361 A | 12/2009 |
| JP | 2010-283616 A | 12/2010 |
| JP | 2012-010269 A | 1/2012 |
| JP | 2012-069505 A | 4/2012 |
| JP | 2012-134691 A | 7/2012 |

OTHER PUBLICATIONS

Form PCT/ISA/237 for corresponding International Application No. PCT/JP2012/078574 dated Dec. 4, 2012.

* cited by examiner

LIGHTING APPARATUS FOR VISIBLE LIGHT COMMUNICATION, AND VISIBLE LIGHT COMMUNICATION SYSTEM USING THE APPARATUS

TECHNICAL FIELD

This invention relates to a lighting apparatus for visible light communication, configured to modulate light intensity of illumination light to superpose a communication signal on the illumination light, and a visible light communication system using the apparatus.

BACKGROUND ART

Conventionally, there has been known a visible light communication system, configured to transmit a communication signal with illumination light. In the visible light communication system, when plural lighting apparatuses are located in a predetermined space and each lighting apparatus has a visible light communication function, communication signals transmitted from the lighting apparatuses may interfere with each other, and accordingly, there is a case where a receiver cannot accurately receive communication information.

In view of this, there has been known an optical transmission system, in which a receiver can accurately receive communication information even in such a space where illumination light including a communication signal is output from each of plural lighting apparatuses (e.g., see JP 2005-176257 A). In this optical transmission system, a lighting apparatus is provided with a receiving unit that is configured to receive a communication signal included in illumination light output from another light source. The lighting apparatus is configured to determine whether or not the communication signal received by the receiving unit agrees with a communication signal to be output from its own light source, and output again an identical communication signal if those communication signals disagree with each other.

However, the optical transmission system in the above-mentioned document needs to provide the lighting apparatus with the receiving unit configured to receive the communication signal, and accordingly, the cost for the system configuration is increased. On the other hand, there is a method of synchronizing, with a single signal, plural lighting apparatuses in the same area to prevent interference of the communication signals. According to this method, one communication signal circuit is connected to a lighting circuit of each lighting apparatus through an electric wire, and the communication signal circuit is configured to output, to each lighting apparatus, a dimming signal on which a modulation signal for modulating light intensity of each light source is superposed. However, in this method, because a relatively-large current, on which the modulation signal is superposed, flows through the electric wire connecting the communication signal circuit and each lighting apparatus, radiation noise increases and accordingly there is a case where the communication signal circuit cannot accurately transmit the modulation signal. In addition, because general purpose electric wires and general purpose lighting apparatuses are mostly non-insulated type of things, it is not easy to secure insulation properties when connecting those.

DISCLOSURE OF THE INVENTION

It is an object of the present invention to provide a lighting apparatus for visible light communication and a visible light communication system using the apparatus, which can suppress generation of radiation noise and accurately transmit a communication signal, upon transmission of a modulation signal that is superposed on illumination light, and further can easily secure insulation properties in a part transmitting the modulation signal.

A lighting apparatus for visible light communication according to an aspect of the present invention is configured to modulate light intensity of illumination light to superpose a communication signal on the illumination light, and the lighting apparatus includes at least one luminaire body and a visible-light-communication-signal-outputting part. The at least one luminaire body includes a light source that includes a solid light-emitting element. The visible-light-communication-signal-outputting part is configured to output a modulation signal to superpose the communication signal on the illumination light emitted by the light source. The at least one luminaire body further includes a power supply circuit, a switch element, an impedance element and a photo-coupler. The power supply circuit is configured to control a load current flowing through the light source based on a dimming signal to dim the light source. The switch element is configured to be turned on and off to modulate an output current that is supplied from the power supply circuit to the light source, in response to reception of the modulation signal. The impedance element is connected in parallel with the switch element. The photo-coupler is configured to receive the modulation signal output from the visible-light-communication-signal-outputting part. The visible-light-communication-signal-outputting part is provided outside the at least one luminaire body, and is connected to the photo-coupler of the at least one luminaire body via a signal line. The at least one luminaire body is configured to feed an ON current to a gate of the switch element, according to the modulation signal transmitted from the visible-light-communication-signal-outputting part via the photo-coupler.

According to this configuration, because only a minute current for driving the photo-coupler flows when the modulation signal is transmitted from the visible-light-communication-signal-outputting part to the at least one luminaire body, it is possible to reduce radiation noise and accurately transmit the modulation signal. Furthermore, because the photo-coupler is used for transmitting the modulation signal, it is possible to easily secure insulation properties in a part transmitting the signal and simplify a circuit configuration.

In the lighting apparatus for visible light communication described above, preferably, the at least one luminaire body further includes a high-frequency-signal-generating part that is configured to output, to the switch element, a high frequency modulation signal having a frequency that is higher than a frequency of the modulation signal transmitted from the visible-light-communication-signal-outputting part.

In the lighting apparatus for visible light communication described above, preferably, the at least one luminaire body includes a plurality of luminaire bodies, and the visible-light-communication-signal-outputting part is connected to a plurality of photo-couplers of the plurality of luminaire bodies via a plurality of signal lines respectively.

In the lighting apparatus for visible light communication described above, preferably, the visible-light-communication-signal-outputting part includes a modulation-signal-generating part that is configured to generate the modulation signal according to a binary information signal that is input from an external. In this case, preferably, a frequency of the modulation signal is set to be at least higher than a frequency of the dimming signal so that a plurality of waveforms are included within one cycle of the dimming signal.

Preferably, the lighting apparatus for visible light communication described above is used in a visible light communication system that includes a receiver configured to receive a communication signal transmitted from the lighting apparatus for visible light communication.

BRIEF DESCRIPTION OF THE DRAWINGS

Preferred embodiments of the present invention will now be described in further details. Other features and advantages of the present invention will become better understood with regard to the following detailed description and accompanying drawings where.

BEST MODE FOR CARRYING OUT THE INVENTION

First Embodiment

Figure 1:
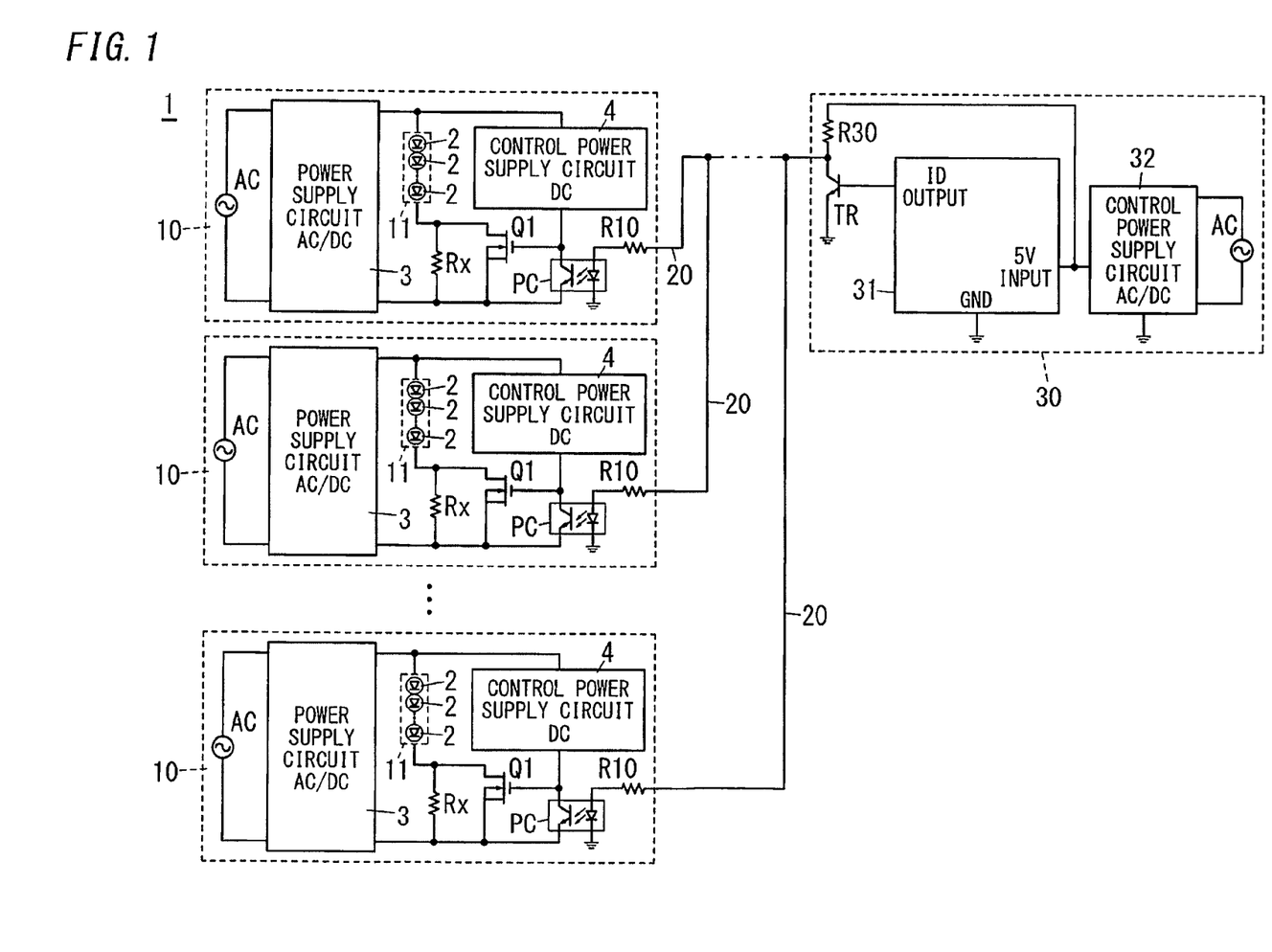
FIG. 1 is a circuit diagram of a lighting apparatus for visible light communication according to a first embodiment of the present invention.

A lighting apparatus for visible light communication according to a first embodiment of the present invention will be described with reference to FIG. 1 and FIG. 2. As shown in FIG. 1, a lighting apparatus 1 for visible light communication of the present embodiment includes a plurality of luminaire bodies 10, and a visible-light-communication-signal-outputting part 30 that is connected to the plurality of luminaire bodies 10 via a plurality of signal lines 20 respectively. The visible-light-communication-signal-outputting part 30 is provided outside the plurality of luminaire bodies 10, and is configured to output a modulation signal for superposing a communication signal on illumination light emitted by a light source 11 of each luminaire body.

Each luminaire body 10 includes: the light source 11 including solid light-emitting elements (LEDs 2); and a lighting circuit configured to modulate light intensity of the illumination light emitted by the light source 11 and superpose the communication signal on the illumination light to perform visible light communication. The lighting circuit of each luminaire body 10 includes a power supply circuit 3 configured to control a load current flowing through the light source 11 based on a dimming signal to dim the light source 11. The power supply circuit 3 includes: an AC/DC converter that receives input power from a commercial power supply AC; and an output controller (not shown) that is configured to control the load current flowing through the light source 11.

Further, the lighting circuit of each luminaire body 10 includes: an impedance element (a resistor for modulation Rx) connected in series with the light source 11; and a switch element (a switch element for modulation Q1) for modulating an output current to be supplied from the power supply circuit 3 to the light source 11. For example, an nMOSFET is used for the switch element Q1. The resistor Rx is connected in parallel with the switch element Q1. One end of the light source 11 is connected to one end of input ends of a control power supply circuit 4 for supplying a gate voltage to the switch element Q1. The other end of the input ends of the control power supply circuit 4 is connected to a photo-coupler PC. The photo-coupler PC is connected, via a DC resistor R10, to a corresponding signal line 20 connected to the visible-light-communication-signal-outputting part 30. Also, at least one end of the input ends of the control power supply circuit 4 is connected to one end of the resistor Rx.

The AC/DC converter (not shown) of the power supply circuit 3 is configured to rectify, with a rectifying circuit, an AC voltage supplied from the commercial power supply AC, and perform switching of a switch element that is a MOSFET for example, and perform smoothing with a smoothing capacitor, thereby converting the AC voltage into a DC voltage.

For example, white LEDs are employed as the LEDs 2 of the light source 11, which are LEDs for emitting illumination light having a desired light color from the luminaire body 10, in each of which a GaN blue LED chip is covered with YAG yellow phosphor and a white light is emitted by mixing a blue light and an yellow light. However, the LEDs 2 are not limited to the white LEDs. LEDs having different light colors such as red, green and green may be combined arbitrarily, or OLEDs each of which employs organic light emitting material as the light source may be used.

The visible-light-communication-signal-outputting part 30 includes a modulation-signal-generating part 31 configured to generate the modulation signal, a control power supply circuit 32 configured to rectify and smooth a voltage supplied from the commercial power supply AC to supply a DC voltage to the modulation-signal-generating part 31, a transistor (for output) TR for outputting the modulation signal received from the modulation-signal-generating part 31. A general purpose microcomputer is used for the modulation-signal-generating part 31. For example, when a microcomputer having 10 pins is used, 1 pin of the 10 pins, as an input end, is connected to the control power supply circuit 32, and another 1 pin, as an output end, is connected to a base of the transistor TR, and another 1 pin is grounded. Further, another 3 pins are used for internal adjustment of the visible-light-communication-signal-outputting part 30. The remaining 4 pins are used for connecting to a USB terminal for example, for information processing performed outside the visible-light-communication-signal-outputting part 30. The visible-light-communication-signal-outputting part 30 includes a feeding circuit for driving a light emitting diode of the photo-coupler PC, with the voltage supplied from the control power supply circuit 32. This feeding circuit is provided with a resistor R30 for potential adjustment.

The output controller of the power supply circuit 3 is formed of a general purpose microcomputer and the like. For example, the output controller performs switching of the switch element in the AC/DC converter, based on a dimming signal transmitted from an external device (not shown) to which dimming operation is input, such as a remote controller, to dim the light source 11 by PWM control. That is, the output controller, as shown in A of FIG. 2, alternately repeats a period (an ON period T1) during which the load current flows through the light source 11 and a period (an OFF period T2) during which no load current flows through the light source 11. The output controller also performs dimming control of the light source 11 by adjusting a ratio (an ON duty ratio) of the ON period T1 to a period T which is a sum of the ON period T1 and the OFF period T2, according to the dimming signal. The PWM control described above is an example of dimming control mainly during non-communication, and the modulation signal may be superposed on a dimming control signal different from the above-mentioned dimming signal shown in A of FIG. 2, during visible light communication described later The modulation-signal-generating part 31 is configured to generate a prescribed modulation signal, as shown in B of FIG. 2, for modulating light intensity of the illumination light of the light source 11 to superpose the communication signal on the illumination light, according to a binary information signal that is input from an external of the visible-light-communication-signal-outputting part 30. A frequency of the modulation signal is set to be at least higher than a frequency of the dimming signal so that a plurality of waveforms are included within one cycle of the dimming signal. The control power supply circuit 4 includes a DC/DC converter, and is configured to convert a DC voltage supplied from the power supply circuit 3 (in the present embodiment, a voltage across the resistor Rx) into a DC voltage having a prescribed voltage value.

Figure 2:
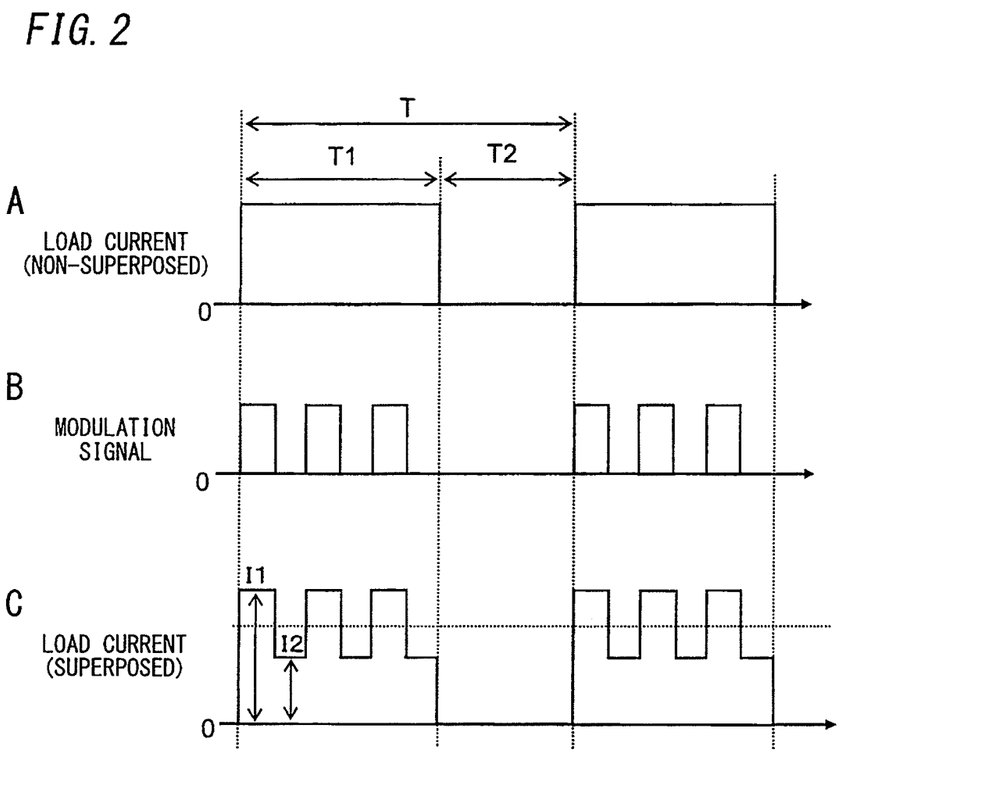
FIG. 2 illustrates operating waveforms of a load current of a light source in the lighting apparatus for visible light communication according to the first embodiment of the present invention, and a modulation signal superposed on the load current.

According to this configuration, the modulation-signal-generating part 31 is configured to generate the prescribed modulation signal, as shown in B of FIG. 2, for modulating the light intensity of the illumination light of the light source 11 to superpose the communication signal on the illumination light, according to the binary information signal that is input from the external of the visible-light-communication-signal-outputting part 30. The modulation signal is transmitted on the signal lines 20, and input to the photo-coupler PC of each luminaire body 10. At this time, the light emitting diode in the photo-coupler PC emits light, and a photo-transistor in the photo-coupler becomes conductive by receiving the emitted light. At this time, because a load is connected to a collector of the photo-transistor in the photo-coupler PC, an ON current flows through a gate of the switch element Q1. When the switch element Q1 is in an ON-state, a load current I1 flows through the light source 11 not via the resistor Rx. On the other hand, when the switch element Q1 is in an OFF-state, a load current I2 flows through the light source 11 via the resistor Rx. Therefore, as shown in C of FIG. 2, a current value of the load current I1 when the switch element Q1 is in the ON-state is larger than a current value of the load current I2 when the switch element Q1 is in the OFF-state. Thus, it is possible to modulate the light intensity of the illumination light of the light source 11 to superpose the communication signal on the illumination light of the light source 11 by changing an amount of the load current flowing through the light source 11.

That is, in the lighting apparatus 1 for visible light communication, the visible-light-communication-signal-outputting part 30 is provided outside the plurality of luminaire bodies 10, and is connected to the plurality of photo-couplers PC of the plurality of luminaire bodies 10 via the plurality of signal lines 20. Each luminaire body 10 is configured to feed the ON current to the gate of the switch element Q1, according to the modulation signal transmitted from the visible-light-communication-signal-outputting part 30 via the photo-coupler PC. In other words, the switch element Q1 is configured to be turned on and off in response to reception of the modulation signal from the visible-light-communication-signal-outputting part 30. As a result, the communication signal is superposed on the illumination light. According to this configuration, illumination lights from the plurality of luminaire bodies 10 used in the lighting apparatus 1 for visible light communication are modulated based on the modulation signal output from the visible-light-communication-signal-outputting part 30. Accordingly, communication signals that are superposed on the illumination lights are synchronized, and therefore it is possible to suppress interference of the communication signals. That is, when the plurality of luminaire bodies 10 are slave units, the visible-light-communication-signal-outputting part 30 functions as a master unit configured to synchronize those slave units and perform the modulation, and the master unit controls the communication signals of the slave units.

In addition, only a minute current for driving the light emitting diode in the photo-coupler PC flows through each signal line 20 connecting the visible-light-communication-signal-outputting part 30 and each luminaire body 10, and a current that is large enough to modulate and dim a luminaire body 10 does not flow through each signal line. Therefore, it is possible to reduce radiation noise. Further, because each luminaire body 10 includes the photo-coupler PC, it is possible to simplify a circuit configuration of a part requiring insulation properties, and easily incorporate the visible light communication system even in non-insulated type of existing lighting apparatus. Therefore, according to the lighting apparatus 1 for visible light communication, it is possible to suppress interference of the communication signals superposed on the illumination lights and generation of noise, and accurately transmit the communication signal, and easily secure insulation properties in a part transmitting the communication signal.

Furthermore, because the resistor Rx connected in parallel with the switch element Q1 is provided in the above-mentioned configuration, the load voltage is supplied from the power supply circuit 3 to the light source 11 without being interrupted even when the switch element Q1 is in an OFF-state. Therefore, the light source 11 is prevented from failing into an unloaded state in the lighting circuit, and a power supply voltage of the power supply circuit 3 is prevented from increasing. Furthermore, because the input end of the control power supply circuit 4 is connected to one end of the resistor Rx, a voltage at the input end of the control power supply circuit 4 is suppressed to a voltage that is determined with a current flowing through the light source 11 and a resistance value of the resistor Rx. Therefore, it is possible to stabilize the power supply voltage of the power supply circuit 3 and the voltage to be input to the control power supply circuit 4, and further reduce circuit loss. Furthermore, for the power supply circuit 3 and the control power supply circuit 4, it is possible to employ not expensive components having high voltage resistance or many components, but general purpose inexpensive circuit components. In addition, because the circuit design is simple, it is possible to achieve reduction of costs and sizes of the lighting circuit and the luminaire body 10 using the same.

Second Embodiment

Figure 3:
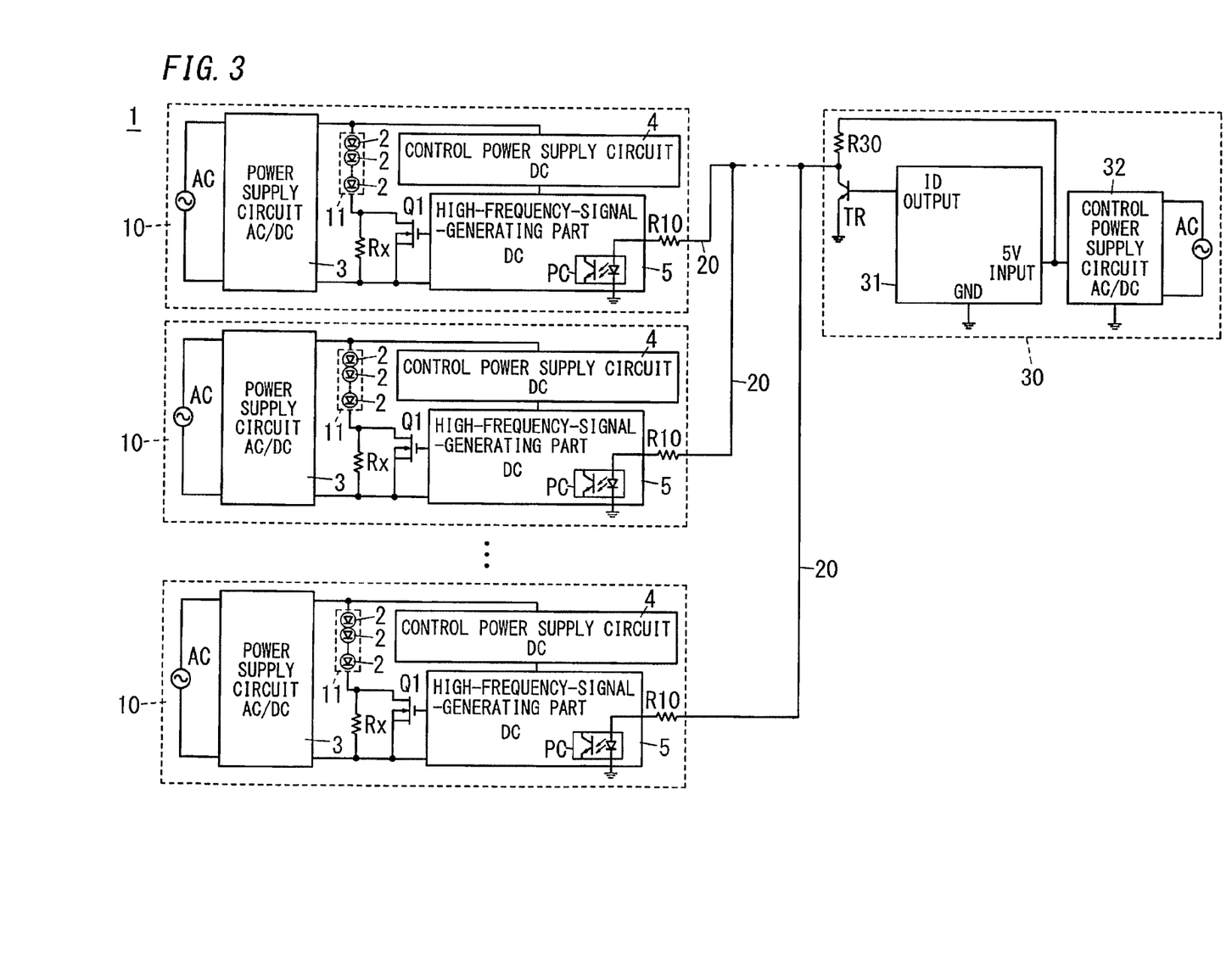
FIG. 3 is a circuit diagram of a lighting apparatus for visible light communication according to a second embodiment of the present invention.
Figure 4:
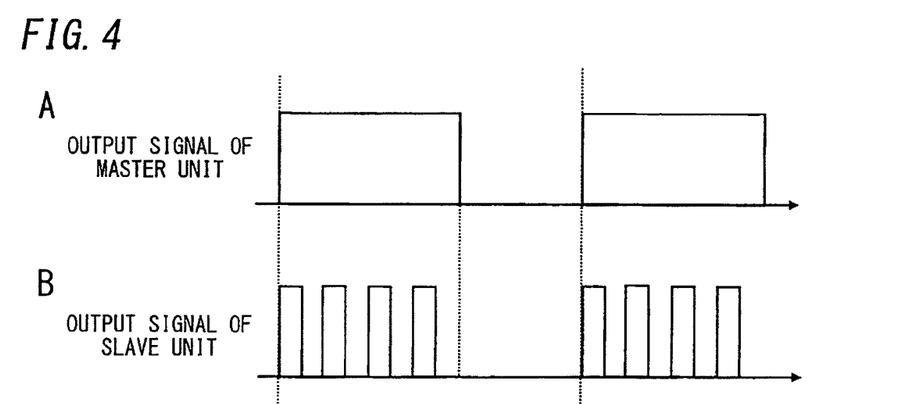
FIG. 4 illustrates operating waveforms of a modulation signal from a visible-light-communication-signal-outputting part and a high frequency modulation signal from a high-frequency-signal-generating part, in the lighting apparatus for visible light communication according to the second embodiment of the present invention.

A lighting apparatus for visible light communication according to a second embodiment of the present invention will be described with reference to FIG. 3 and FIG. 4. As shown in FIG. 3, in a lighting apparatus 1 for visible light communication of the present embodiment, each luminaire body 10 further includes a high-frequency-signal-generating part 5 which is configured to output, to a switch element (for modulation) Q1, a high frequency modulation signal having a frequency that is higher than a frequency of a modulation signal transmitted from a visible-light-communication-signal-outputting part 30. Other configurations are similar to those of the above-mentioned embodiment.

The high-frequency-signal-generating part 5 of each luminaire body 10 (slave unit) divides, into plural subcarriers, a modulation signal (A of FIG. 4) transmitted from the visible-light-communication-signal-outputting part 30 (master unit) via a photo-coupler PC, and outputs a high frequency modulation signal (B of FIG. 4) to the switch element Q1. In the present embodiment, the modulation signal from the visible-light-communication-signal-outputting part 30 has a frequency of about 5 to 10 kHz for example, and the high frequency modulation signal from the high-frequency-signal-generating part 5 has a frequency of about 30 to 40 kHz for example. Such plural subcarriers are mutually in an orthogonal relationship and do not interfere with each other, even when arranged closely enough to overlap with each other on a frequency axis. Therefore, it is possible to enhance frequency utilization efficiency and serialize large-capacity communication information and transmit the serialized information at high speed.

According to this configuration, high frequency subcarrier components in the modulation signal are generated by not the visible-light-communication-signal-outputting part 30 but each luminaire body 10. Therefore, because no high frequency signal flows through each signal line 20 connecting the visible-light-communication-signal-outputting part 30 and a corresponding luminaire body 10, it is possible to prevent radiation noise from generating on the signal line 20.

Figure 5A:
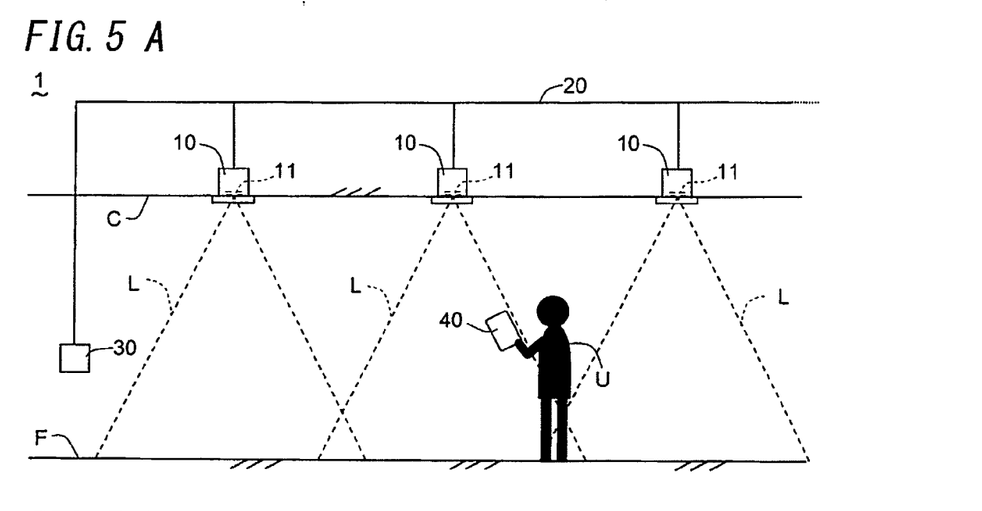
FIG. 5A is a lateral view of a visible light communication system with the lighting apparatus for visible light communication according to the second embodiment of the present invention.

Next, a configuration example of a visible light communication system using the lighting apparatus 1 for visible light communication will be described with reference to FIGS. 5A and 5B. The lighting apparatus 1 for visible light communication includes a receiver 40, in addition to the above-mentioned luminaire bodies 10 and visible-light-communication-signal-outputting part 30. The receiver 40 is configured to receive a communication signal transmitted from a luminaire body 10. As shown in FIG. 5A, each luminaire body 10 is a downlight embedded in a ceiling C, and each light source 11 emits illumination light L toward a prescribed area on a floor F. The visible-light-communication-signal-outputting part 30 may be incorporated in a distribution board or various dimmer.

Figure 5B:
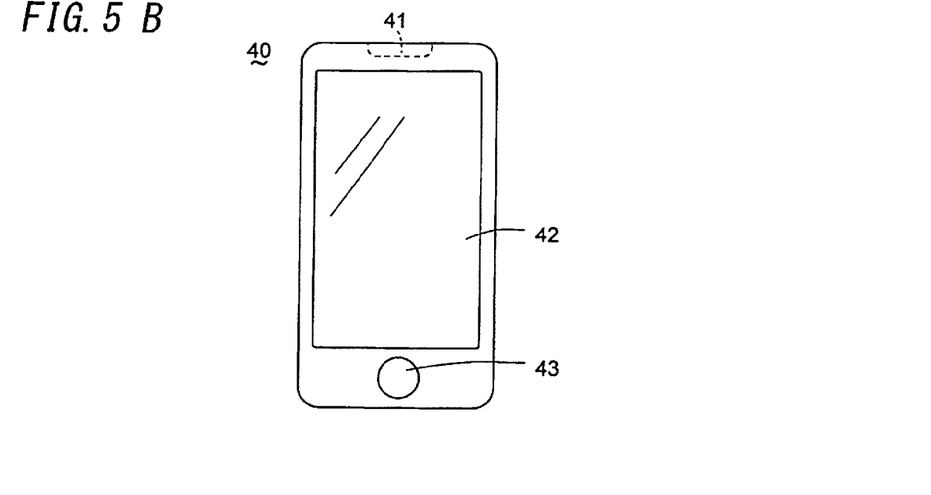
FIG. 5B is a front view of a receiver in the visible light communication system with the lighting apparatus for visible light communication according to the second embodiment of the present invention.

The receiver 40 is for example a mobile terminal as shown in FIG. 5B, and includes a light-receiving part 41 that includes a photo-diode and the like for receiving illumination light emitted by a luminaire body 10. The receiver 40 further includes: a display part 42 that includes a liquid crystal display and the like; an operating part 43; and a signal processing circuit (not shown) that is configured to read a communication signal based on light intensity of the illumination light L received by the light-receiving part 41, for example. If a display with a touch panel function is used for the display part 42, a function of the operating part 43 can be realized by this display part 42. The light-receiving part 41 may be a camera including a CMOS sensor. That is, a general mobile phone may be used for the receiver 40, in which signal processing software for reading a communication signal is installed. The receiver 40 is not limited to the mobile terminal described above, and may be a receiver with other configurations.

According to this configuration, as shown in FIG. 5A, a user U can receive a communication signal superposed on illumination light emitted by a luminaire body 10 within the illumination area of the luminaire body 10, by using the receiver 40. The communication signal includes position information, image information, voice information and the like. The user U can obtain, through the display part 42 or the like, such information included in the communication signal, by using the receiver 40. In addition, because the communication signal output by each luminaire body 10 is synchronized with the modulation signal output by the visible-light-communication-signal-outputting part 30, the user U can accurately receive communication information even at any position within a space in which the visible light communication system is installed.

The invention is not limited to the above-mentioned embodiments, and numerous variations can be made. For example, the control power supply circuit 4 may be provided with a backup power supply (not shown) that includes a secondary battery and a charging circuit for charging the secondary battery with an output of an AC/DC converter. Further, an LED may be used as the impedance element in addition to the resistor Rx. In this case, for example, when the commercial power supply AC is unavailable due to power failure caused by disasters or the like, it is possible to make the LED function as an auxiliary light source by turning on the LED with power supplied from the above-mentioned backup power supply.

Although the present invention has been described with reference to certain preferred embodiments, numerous modifications and variations can be made by those skilled in the art without departing from the true spirit and scope of this invention, namely claims.

The invention claimed is:

1. A lighting apparatus for visible light communication, configured to modulate light intensity of illumination light to superpose a communication signal on the illumination light, the lighting apparatus comprising:
   at least one luminaire body comprising a light source that includes a solid light-emitting element; and
   a visible-light-communication-signal-outputting part configured to output a modulation signal to superpose the communication signal on the illumination light emitted by the light source,
   wherein the at least one luminaire body further comprises:
   a power supply circuit configured to control a load current flowing through the light source based on a dimming signal to dim the light source;
   a switch element configured to be turned on and off to modulate an output current that is supplied from the power supply circuit to the light source, in response to reception of the modulation signal;
   an impedance element connected in parallel with the switch element; and
   a photo-coupler configured to receive the modulation signal output from the visible-light-communication-signal-outputting part,
   wherein the visible-light-communication-signal-outputting part is provided outside the at least one luminaire body, and is connected to the photo-coupler of the at least one luminaire body via a signal line, and
   wherein the at least one luminaire body is configured to feed an ON current to a gate of the switch element, according to the modulation signal transmitted from the visible-light-communication-signal-outputting part via the photo-coupler.

2. The lighting apparatus for visible light communication according to claim 1,
wherein the at least one luminaire body further comprises a high-frequency-signal-generating part,
the high-frequency-signal-generating part being configured to output, to the switch element, a high frequency modulation signal having a frequency that is higher than a frequency of the modulation signal transmitted from the visible-light-communication-signal-outputting part.

3. The lighting apparatus for visible light communication according to claim 2,
wherein the at least one luminaire body comprises a plurality of luminaire bodies, and
wherein the visible-light-communication-signal-outputting part is connected to a plurality of photo-couplers of the plurality of luminaire bodies via a plurality of signal lines respectively.

4. A visible light communication system, comprising:
the lighting apparatus for visible light communication according to claim 3; and
a receiver configured to receive a communication signal transmitted from the lighting apparatus for visible light communication.

5. A visible light communication system, comprising:
the lighting apparatus for visible light communication according to claim 2; and
a receiver configured to receive a communication signal transmitted from the lighting apparatus for visible light communication.

6. The lighting apparatus for visible light communication according to claim 1,
wherein the at least one luminaire body comprises a plurality of luminaire bodies, and
wherein the visible-light-communication-signal-outputting part is connected to a plurality of photo-couplers of the plurality of luminaire bodies via a plurality of signal lines respectively.

7. A visible light communication system, comprising:
the lighting apparatus for visible light communication according to claim 6; and
a receiver configured to receive a communication signal transmitted from the lighting apparatus for visible light communication.

8. The lighting apparatus for visible light communication according to claim 1,
wherein the visible-light-communication-signal-outputting part comprises a modulation-signal-generating part,
the modulation-signal-generating part being configured to generate the modulation signal according to a binary information signal that is input from an external, and
wherein a frequency of the modulation signal is set to be at least higher than a frequency of the dimming signal so that a plurality of waveforms are included within one cycle of the dimming signal.

9. A visible light communication system, comprising:
the lighting apparatus for visible light communication according to claim 8; and
a receiver configured to receive a communication signal transmitted from the lighting apparatus for visible light communication.

10. A visible light communication system, comprising:
the lighting apparatus for visible light communication according to claim 1; and
a receiver configured to receive a communication signal transmitted from the lighting apparatus for visible light communication.

* * * * *